United States Patent [19]

Dremin et al.

[11] 4,014,979

[45] Mar. 29, 1977

[54] METHOD OF PRODUCING WURTZITE-LIKE BORON NITRIDE

[76] Inventors: Anatoly Nikolaevich Dremin, p.o. Chernogolovka, 3 ulitsa, 3, kv. 4; Oleg Nikolaevich Breusov, p.o. Chernogolovka, I ulitsa, 25, kv. 26; Tamara Vasilievna Bavina, p.o. Chernogolovka, I ulitsa, 14a, kv. 21, all of Moskovskaya oblast, Noginsky raion; Sergei Vladimirovich Pershin, ulitsa Komsomolskaya, 132, Noginsk Moskovskoi oblasti, all of U.S.S.R.

[22] Filed: July 3, 1975

[21] Appl. No.: 592,715

Related U.S. Application Data

[63] Continuation of Ser. No. 248,526, April 28, 1972, abandoned.

[30] Foreign Application Priority Data

July 19, 1971   U.S.S.R. .......................... 1692355

[52] U.S. Cl. .............................................. 423/290
[51] Int. Cl.$^2$ .................. C01B 21/06; C01B 35/14
[58] Field of Search ............ 423/290, 446; 51/307, 51/309

[56] References Cited

UNITED STATES PATENTS

| | | | |
|---|---|---|---|
| 3,212,851 | 10/1965 | Bundy et al. | 51/307 X |
| 3,367,766 | 2/1968 | Barrington et al. | 423/291 |
| 3,401,019 | 9/1968 | Cowan et al. | 423/446 |
| 3,667,911 | 6/1972 | Balchan et al. | 264/332 X |

OTHER PUBLICATIONS

Dulin et al., "Soviet Physics", vol. 2, No. 5, Nov. 1969, pp. 1016–1020 (Trans.).

*Primary Examiner*—G. O. Peters
*Attorney, Agent, or Firm*—Holman & Stern

[57] ABSTRACT

A powder of boron nitride having a graphite structure is mixed with cooling additives having a shock impedance different from that of the boron nitride having a wurtzite structure being formed. The resulting mixture is placed into a protective device, said device being then placed in an explosive charge ensuring the generation of a shock wave having an intensity of not less than 100 kbar.

The wurtzite-like boron nitride thus produced has a pycnometric density of 3.10 to 3.38 g/cm$^3$, a specific surface area of not less than 10 m$^2$g, a temperature of transition into graphite-like boron nitride of about 700° C and a refractive index less than 2.10 for red light.

5 Claims, 4 Drawing Figures

METHOD OF PRODUCING WURTZITE-LIKE BORON NITRIDE

This is a continuation of application Ser. No. 248,526, filed Apr. 28, 1972, now abandoned.

The present invention relates to the production of superhard materials and more particularly to the production of boron nitrite having a wurtzite structure.

A modification of boron nitride having a wurtzite structure is known and will be herein termed, for the sake of brevity, as wurtzite-like boron nitride having crystal lattice parameters $a_o = 2.55$ A and $c_o = 4.20$ A at a temperature of 25° C.

This modification of boron nitride is characterized by a density of about 3.43 g/cm$^3$, a Mohs' hardness of about 10, a refractive index of about 2.22 for red light (cf., e.g., U.S. Pat. No. 3,212,851 of Oct. 19, 1965).

Such wurtzite-like boron nitride is produced by subjecting boron nitride having a graphite structure, hereinafter referred to as graphite-like boron nitride to a static pressure on the order of 110 and 130 kbar and a temperature of from 25° to 2200° C with the use of any known high-pressure reaction vessels. However, there are serious difficulties associated with the practical realization of the above-described method, since it requires costly and complicated apparatus and equipment for the creation of high pressures. It should be also taken into account that the working space of the presently known high-pressure reaction vessels is approximately 1 cm$^3$, so that the quantity of wurtzite-like boron nitride which can be produced during one cycle of treatment of graphite-like boron nitride is rather insignificant and produces from 1 to 3 carats.

Methods of producing wurtzite-like boron nitride by subjecting graphite-like boron nitride to the action of a shock wave with an amplitude of not less than 128 kbar — are known in the art — (cf., e.g., Adadurov, et al., DOkl. AN SSSR, 172, 5, 1066–1068, 1967). For the realization of such a method, graphite-like boron nitride is placed in a metal protective device, said device being subject to the action of a shock wave.

In the description which follows the product formed in the protective device as a result of the action produced by the shock wave on graphite-like boron nitride will in some cases be termed as the recovered specimen.

In the disclosed method, boron nitride is subject to the action of reiterated shock waves reflected from the walls of the protective device.

We have established that the percentage of conversion of graphite-like boron nitride into wurtzite-like boron nitride in recovered specimens depends on the ratio of the full time of action of the shock wave to the time of passage of the shock wave front through the boron nitride layer. The greater this ratio, the higher the percentage of the conversion of graphite-like boron nitride into wurtzite-like boron nitride, with maximum pressure of shock compression in the boron nitride being attained in this case faster and as a result of a greater number of reflected shock waves than in the case when the ratio of said magnitudes is lower.

If a shock wave is created by detonation of an explosive charge in contact with the protective device, the full time of the action of the shock wave (in other words, the length in time of the shock wave from its front with maximum pressure to the point wherein the pressure is equal to atmospheric) depends on the size of the explosive charge; the larger the charge, the greater is the time of action of the shock wave.

If a shock wave in a protective device is created by the impact of a plate accelerated to a high speed, the full time of the action ofthe shock wave is determined by the thickness of this plate. The greater the plate thickness, the greater is the time of action of the shock wave. The plate can be accelerated either by detonating an explosive charge or with the help of a gas gun.

The time of passage of the front of a shock wave through the layer of boron nitride depends on the layer thickness and on the velocity of the shock wave front; with a preset velocity of the shock wave front the greater the layer thickness the greater is the passage of time.

In thin layers (on the order of 1 mm) 80 percent conversion of graphite-like boron nitride into wurtzite-like boron nitride is attainable.

With a boron nitride layer having a definite thickness and a shock wave having a pre-set constant intensity, the length of the shock wave time can be smaller than the time of the shock wave propagation through the layer of boron nitride. In this case boron nitride can be subjected to the reiterated action of separate reflected shock waves having diminishing intensities, with maximum pressure of shock compression being attained in the first incoming shock wave. With very great thicknesses of the boron nitride layer, the shock wave may completely fade in the layer. In such a caseboron nitride is subject to the action of the passing shock wave, maximum pressure being attained at the entrance of the shock wave.

However, these circumstances impose limitations on the quantity of graphite-like boron nitride permissible for treatment during one cycle and, hence, on the quantity of wurtzite-like boron nitride obtained.

It is an object of the present invention to increase the quantity of wurtzite-like boron nitride obtainable for one cycle of treatment of graphite-like boron nitride.

Another object of the present invention is to increase the percentage of conversion of graphite-like boron nitride into wurtzite-like boron nitride.

Said and other objects of the invention are accomplished by subjecting graphite-like boron nitride to the action of a shock wave, and according to the invention, graphite-like boron nitride is mixed with additives that have a shock impedance different from that of the wurtzite-like boron nitride being formed, which ensures a stepwise increase in the pressure to a value of not less than 100 kbar, and which has a residual temperature lower than that of the wurtzite-like boron nitride being formed.

The meaning of shock impedance is the product of the initial density of the substance times the velocity of the shock wave front. For wurtzite-like boron nitride, the shock impedance is similar to the case of cubic boron nitride at 120 kbar and is equal to $2.8 \cdot 10^6$ g/cm$^2$·sec.

The advantage offered by the herein-proposed method resides in the fact that due to the presence of said additives even in "thick" layers of the powder a single passage of the shock wave through the layer of the mixture is followed by reiterated reflections of these waves from the boundaries of the particles of boron nitride and additives, so that all the particles of boron nitride are subject to the reiterated action of the reflected waves, with the final pressure of shock compression being attained stepwise. The introduction of said additives allows for a substantial increase in the volume of the starting graphite-like boron nitride without increasing the size of the explosive charge and thus produces an increase in the quantity of wurtzite-like boron nitride per cycle.

Since the shock waves are reflected from the interface between the particles in different directions, each particle of the powder is subject to random shear displacements. As a result, mutual orientation takes place between the already originated minutest muclei of the wurtzite-like boron nitride, this mutual orientation contributes to the integration of these nuclei into larger and, hence, more stable crystallites. This, in turn, leads to a higher percentage yield of wurtzite-like boron nitride in the protective device. An increase in the degree of the irreversible conversion of the graphite-like boron nitride into wurtzite-like boron nitride is also ensured by the choice of the additives due to the fact that their residual temperature caused by the shock compression is essentially lower than the residual temperature of the wurtzite-like boron nitride being formed.

The degree to which the substance is heated by the shock wave is determined by the amplitude of the shock wave and by the properties of the substance. Therefore different substances present in the mixture being treated by the shock wave are heated to different temperatures. Since the above-mentioned additives are heated to a smaller degree than the wurtzite-like boron nitride, the latter quickly transmits its excess heat to the additives, which leads to the diminution of the degree of reverse conversion and to an enhancement of the yield of the desired product.

It is preferable to use liquids as the additives, since the degree of heating of the substance by the shock wave action, among other things, depends also on the porosity of the substance; the higher the porosity of the substance, the higher the residual temperature values will be under the same shock compression pressure. Liquid additives are also preferable due to the fact that while filling the pores between the particles of graphite-like boron nitride they do not diminish the content of the graphite-like boron nitride within the same volume of the protective device. As liquid additives it is reasonable to use water and aqueous alkaline solutions which are chemically inert to the starting graphite-like boron nitride at room temperature. The employment of these liquids makes it possible to reduce the content of the graphite-like boron nitride admixture in the final product, since water or aqueous alkaline solution under the conditions of high residual temperatures are capable of dissolving the graphite-like boron nitride that has undergone shock effects, but they are chemically inert to the formed wurtzite-like boron nitride. The use of water and aqueous alkaline solutions as the additives allows the content of the graphite-like boron nitride in the final product to be reduced to 0.5 wt.%.

The wurtzite-like boron nitride produced by the present method essentially differs from the known wurtzite-like boron nitride produced by the action of high static pressures. It has the same parameters of the crystal cell, namely, $a_o = 2.55$ A and $c_o = 4.20$ A at 25° C and is characterized by Mohs' hardness of about 10. The wurtzite-like boron nitride, according to the invention, however has a pycnometric density of 3.10 to 3.38 g/cm$^3$, a refractive index less than 2.10 for red light, a specific surface area of not less than 10 m$^2$/g, and a temperature of the commencement of its conversion into graphite-like boron nitride of about 700° C.

This change in the properties of the wurtzite-like boron nitride produced with the use of shock waves as compared to the known wurtzite-like boron nitride, is caused by an exclusively high degree of imperfection if its crystal lattice that is originated under the shock compression conditions. The high degree of imperfection of this product brings about an increase in the mobility of its atoms in the crystal lattice. Under normal, or atmospheric, pressures this causes a reduction of the graphitization temperature to 700° C, and under high pressures, a reduction of the pressure of conversion into cubic boron nitride. Without the addition of special catalysts wurtzite-like boron nitride produced by the action of static pressure becomes converted into cubic boron nitride under the action of pressures not lower than 110 kbar (F. P. Bundy, R. H. Wentorf; J. Chem. Phys. 38, No. 2, p. 1144 (1963).

Wurtzite-like boron nitride produced by the present method features an enhanced activity and is converted into cubic boron nitride under a substantially lower pressure — of about 40 to 50 kbar. Essential differences in the physico-chemical properties of the wurtzite-like boron nitride produced with the use of shock compression and of the known wurtzite-like boron nitride produced with the use of static pressure allow the product produced by the present method to be regarded as a novel material — wurtzite-like boron nitride having an enhanced activity.

Such surtzite-like boron nitride with the enhanced activity can be produced within a wide range of shock pressures and with the use of various additives. The additives include metals such as molybdenum, copper, iron or aluminum and metal halides such as lead chloride, sodium chloride, lead fluoride, lead bromide, potassium bromide and lithium fluoride. Maximum activity, that is, maximum difference of the properties of the wurtzite-like boron nitride produced by the method of the invention from the properties of the known wurtzite-like boron nitride was attained by us under the conditions which will be further termed as the preferred ones, namely, under the shock compression of a mixture of graphite-like boron nitride with water or with 1–5% aqueous solutions of alkaline reagents (such as NaOH, KOH, Na$_2$CO$_3$) in a weight ratio of from 1:0.5 to 1:0.2 for the solid and liquid phases respectively. The preferred conditions of shock compression of this mixture are realized in a cylindrical protective device by detonating a charge that surrounds it and consists of cast trotyl or loose hexogene having a density of 1.1 g/cm$^3$. The employment of the preferred conditions makes possible for the production of wurtzite-like boron nitride with a minimum pycnometric density (3.10 g/cm$^3$), a maximum specific surface area (more than 20 m$^2$/g) and minimum refractive index (less than 2.10 for red light). Moreover, the employment of the preferred conditions allows for carrying out the maximum degree of conversion of graphite-like boron nitride into the wurtzite-like boron nitride with an enhanced activity (more than 90%) and for obtaining the final product having a minimum content of graphite-like boron nitride (to 0.5 wt.%).

The present invention will be better understood from a consideration of examples given hereinbelow, in which the production of wurtzite-like boron nitride with an enhanced activity, according to the invention, is illustrated, and from the accompanying drawings, wherein.

As essential feature of the present invention resides in that boron nitride is subjected to the action of shock waves.

The shock wave parameters are interrelated by the laws of conservation of the mass and impulse which lead to the equations $$D/V_o = D-U/V \quad (1)$$

and $$P = DU/V_o \quad (2),$$

where
$V_o$ is the initial specific volume of the substance;
$V$ is the specific volume of the substance attained under shock compression;
$P$ is the shock compression pressure;
$D$ is the velocity of the shock wave front;
$U$ is the mass velocity of the substance behind the shock wave front.

If the kinematic parameters $D$ and $U$ of a shock wave are known, the pressure and the specific volume of the substance can be calculated from equations (1) and (2). The parameters $D$ and $U$ can be rather accurately registered by modern experimental techniques.

Figure 1:
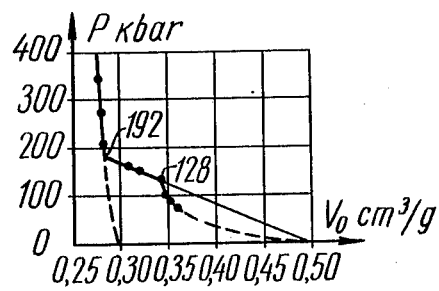
FIG. 1 shows the shock adiabat of graphite-like boron nitride.

The shock adiabat (FIG. 1) (the curve of shock compressibility) of graphite-like boron nitride with an initial density $\rho = 1/V_o = 2.0$ g/cm$^3$ (Doklady AN SSSR 175 (5) 1066 (1967)) was obtained by the method of reflection (ZhETF 34, 886 (1958)), that is, by the method when D is registered in the specimens under investigation and P and U are found from the P, U-diagram. The parameters of shock waves in the metallic plate were known from preliminary experiments.

According to the shock adiabat (FIG. 1), under a shock compression pressure above 192 kbar the conversion of graphite-like boron nitride into wurtzite-like boron nitride occurs directly in the shock wave front. The time of conversion is equal to the quotient obtained by dividing the width of the shock wave front by the velocity thereof. The width of the shock wave front in boron nitride is approximately equal to the size of its particles, which usually ranges fron one to ten microns. The velocity of a shock wave with the pressure in its front of about 192 kbar equals 4.70 km/sec. Consequently, the time of conversion is less than $10^{-9}$ sec.

The shock waves in graphite-like boron nitride having a pressure of from 128 to 192 kbar are unstable; in this region of pressures two shock waves originate, following one another, the first shock wave, irrespective of the pressure applied, has a constant amplitude of 128 kbar, and the second shock wave propagating within the substance compressed by the first shock wave has a velocity smaller than the first shock wave. The conversion of graphite-like boron nitride into wurtzite-like boron nitride takes place in the front of the second shock wave. The time of this conversion is on the order of $10^{-6}$ sec. and under a pressure somewhat higher than 128 kbar and diminishes with an increase in the pressure.

Under pressures of shock compression lower than 128 kbar the conversion may also take place, but a noticeable degree of this conversion is attained behind the shock wave front after a period of time greater than the time of propagation of the shock wave front through the layer of graphite-like boron nitride; therefore it is not registered in the experiments for the determination of the shock adiabat of graphite-like boron nitride in which the thickness of the layers of graphite-like boron nitride (that served as a reference for measuring the shock wave velocity) amount to several millimeters.

With a shock compression pressure higher than 192 kbar, according to the shock adiabat, complete conversion of graphite-like boron nitride into its close-packed modification takes place. This conclusion follows from the following result. If we extrapolate the upper portion of the shock adiabat (the portion lying above 192 kbar) to the axis of volumes, its intersection with the axis of volumes gives the specific volume (0.3 cm$^3$/g) approximately corresponding to the specific volume of the close-packed modification of boron nitride. For close-packed modifications of boron nitride the specific volume under normal pressure is equal to $1/\rho \approx 0.286$ cm$^3$/g, where $\rho \approx 3.5$ g/cm$^3$ is the density of the cubic and wurtzite-like modifications of boron nitride.

It should be pointed out that the shock adiabat was determined for porous graphite-like boron nitride. This boron nitride had an initial density of 2.0 g/cm$^3$, whereas the density of single crystals of graphite-like boron nitride is 2.26 g/cm$^3$.

It is known that the shock adiabat of a porous substance, when plotted in the pressure-specific volume co-ordinates, lies to the right of the shock adiabat of a monolithic substance. Moreover, as graphite-like boron nitride has a crystal density of 2.26 g/cm$^3$ and the close-packed modifications of boron nitride has about 3.5 g/cm$^3$, the graphite-like boron nitride can in a certain sense be regarded as porous boron nitride having a close-packed modification. Porosity may be the reason for a certain discrepancy between the above-cited values (0.3 cm$^3$/g and 0.286 cm$^3$/g).

Our experiments have shown the close-packed modification of boron nitride which forms under the action of a shock wave to be wurtzite-like boron nitride. However, behind the front of the shock wave all the wurtzite-like boron nitride consists of nuclei the size of which is less than the critical one at the residual temperature in the protective device. Therefore under the action of a passing shock wave even with a pressure above 192 kbar the content of wurtzite-like boron nitride in the protective device is negligibly small. This is due to the fact that all the wurtzite-like boron nitride which has formed under a high pressure behind the shock wave front undergoes a reverse conversion into graphite-like boron nitride under the conditions of the residual temperature of shock compression in the protective device.

The compression of the substance by the shock wave is irreversible. Part of the energy of the shock wave after it has passed through the substance remains in the substance as heat. As a result, the substance, after the passage of the shock wave, has a residual temperature higher than the temperature prior to the shock compression.

Thermodynamically, under the conditions of high pressures, the formation of larger crystals is advantageous, since the substance tends to have minimum surface energy, but insofar as the time of action of the shock wave is small, the usual diffusion mechanism of aggregation is not effective. With the reiterated passage of shock waves through the shock-compressed substance and a stepwise attainment of maximum shock compression pressure, a relative displacement takes place and in turn forms the nuclei of wurtzite-like boron nitride. Another rapid mechanism of agglomeration becomes possible here; the nuclei are associated into a single crystallite when their crystallographic directions coincide. The dimensions of the formed crystallites of wurtzite-like boron nitride are sufficiently large and they do not undergo complete inverse conversion into graphite-like boron nitride under the effect of residual temperatures in the protective devices.

Exemplary embodiments of the present invention will now be considered.

EXAMPLE 1

Figure 2:
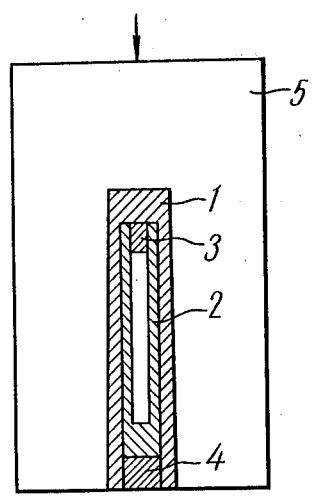
FIG. 2 is a sectional view of an arrangement for obtaining a shock wave by explosion.

5 g of graphite-like boron nitride powder are taken having a pycnometric density of 2.26 g/cm$^3$, and a shock impedance of about $0.5.10^6$ g/cm$^2$·sec, and 5 g of a powder of lead chloride that has a shock impedance of about $2.0.10^6$ g/cm$^2$· sec. In the herein example and in the Examples which follow the values of shock impedance are cited for a shock wave having an amplitude of 120 kbar. In the subsequent Examples the pycnometric density of the graphite-like boron nitride is also equal to 2.26 g/cm$^3$. The graphite-like boron nitride and lead chloride is thoroughly mixed in a ball mill. The resulting mixture is charged into a protective device shown in FIG. 2.

The protective device consists of two metallic containers 1 and 2 arranged one inside the other, each of them being closed with respective plugs 3 and 4. The external container 1 is a truncated cone 145 mm in height and with diameters of the bases being 28 and 32 mm respectively. The internal space of this container is made cylindrical 16 mm in diameter and 130 mm in height. The internal container 2 is a cylinder 16 mm in diameter and 115 mm in height. The internal space of this container into which the powder mixture is placed is 8 mm in diameter and 85 mm in height. The plugs 3 and 4 are 15 mm high. The cylindrical charge 5 is arranged coaxially with the protective device, and has a diameter of 120 mm and made of loose hexogene with a density of 1.1 g/cm$^3$.

When the charge is detonated, a shock wave passes through the protective device accommodating said mixture, the parameters of which can be calculated (cf. Fizika goreniya i vzryva, No. 2, 281 (1967) USSR).

After the explosion the protective device is opened. The mixture is treated with dilute (1:1) nitric acid until the lead chloride and the inclusions of protective device material are completely removed therefrom. The mixture of the formed wurtzite-like boron nitride and graphite-like nitride is then treated for 12 hours at 200° C with concentrated sulphuric acid into which sodium fluoride powder is added gradually. The quantitative weight ratio of the boron nitride powder being treated, to sulphuric acid and sodium fluoride is 1:20:3 respectively. Treatment with a hot mixture of sulphuric acid and sodium fluoride leads to the decomposition of the graphite-like boron nitride and produces a final product of graphite-like boron nitride in an amount of not higher than 3 wt.%. The residue is washed with water and dried at a temperature of 200 to 300° C.

The yield of wurtzite-like boron nitride with such method is 60% of the initial quantity of the graphite-like boron nitride powder. The pycnometric density of such wurtzite-like boron nitride was found to be 3.23 g/cm$^3$, as determined at 25° C in toluene. The refractive index of the wurtzite-like boron nitride for red light was found to be less than 2.10, as determined by the Becke line immersion method with the use of a high-refracting liquid consisting of, a melt of sulphur and selenium as the immersion medium. The specific surface area of the wurtzite-like boron nitride, as determined by the absorption of krypton, was 38.5 m$^2$/g.

We have carried out an experiment on the production of wurtzite-like boron nitride from graphite-like boron nitride in the same ampoule in the absence of additives. The resulting product contained about 40 percent of wurtzite-like boron nitride. Thus the method proposed by us allows a 20% increase in the yield of wurtzite-like boron nitride over the method known heretofore.

In another experiment a mixture of graphite-like and cubic boron nitride taken in a ratio of 1:1 was used. Under the same conditions (the same protective device and explosive charge) a product was obtained that contained 17 percent of wurtzite-like boron nitride, 33 percent of graphite-like boron nitride and 50 percent of the initial cubic boron nitride. It thus becomes evident that the additives which do not differ in their shock impedance and degree of heat in the shock wave from wurtzite-like boron nitride have no influence on the degree of conversion.

EXAMPLE 2

5 g of graphite-like boron nitride powder and 5 g of sodium chloride having a dynamic rigidity of $1.1.10^6$ g/cm$^2$· sec. are mixed as described in Example 1 and placed into a protective device, as described in Example 1, whereafter the charge is detonated. After the action of the shock wave the mixture is taken from the protective device and first treated with water to remove the sodium chloride, then with dilute hydrochloric acid to remove the protective device material from the mixture, and finally washed with water and dried as described in Example 1.

The yield of wurtzite-like boron nitride in this case was 70 wt.%, its pycnometric density was 3.28 g/cm$^3$, specific surface area was 40 m$^2$/g, and refractive index was less than 2.10 for red light. The temperature of transition into graphite-like boron nitride was about 700° C.

EXAMPLE 3

A mixture of 5 g of graphite-like boron nitride powder and 5 g of molybdenum powder having a dynamic rigidity of about $5.5.10^6$ g/cm$^2$· sec are mixed and the mixture is treated as described in Example 1. The product extracted from the protective device after the explosion is treated with a mixture of concentrated nitric and hydrofluoric acids to remove the molybdenum and inclusions of the ampoule material from the product, whereafter the product is washed with water and dried as in Example 1. The yield of pure wurtzite-like boron nitride is 80% of the weight of the graphite-like boron weight of the final product is 2.4 g, with 95 wt.% being wurtzite-like boron nitride.

Part of the graphite-like boron nitride is dissolved due to chemical interaction with water, with the reaction proceeding according to the equation:

$$BN + 3H_2O = NH_3 + H_3BO_3$$

In this reaction the agent which interacts with water is the graphite-like boron nitride that has undergone the action of the shock waves.

Thus, the water additive not only contributes to the considerable yield of wurtzite-like boron nitride, but also contributes to the obtainment of a more pure final product due to the chemical interaction of water with the graphite-like boron nitride at residual temperatures.

The wurtzite-like boron nitride has a density of 3.10 g/cm$^3$, a refractive index in red light of less than 2.10, a temperature of the commencement of transition into graphite-like boron nitride of 700° C, and a specific surface area of 45 m$^2$/g.

EXAMPLE 12

A mixture of 2.5 g of graphite-like boron nitride powder and 2.5 g of a 1% solution of NaOH are treated as described in Example 1.

After the detonation of the explosive charge, the contents of the ampoule are treated as described in Example 11. The weight of the final product is 2.4 g and it contains 99% of wurtzite-like boron nitride. Part of the graphite-like boron nitride is dissolved due to chemical interaction which proceeds according to the equation:

$$BN + 3NaOH = NH_3 + Na_3BO_3$$

The density of the wurtzite-like boron nitride is 3.28 g/cm$^3$; the refractive index in red light is less than 2.10; the temperature of the commencement of transition into graphite-like boron nitride is about 700° C; and the specific surface area is 31 m$^2$/g.

EXAMPLE 13

A mixture of 3 g of graphite-like boron nitride powder and 2 g of water are treated as described in Example 1. After the detonation of the explosive charge, the contents of the protective device are treated as described in Example 11. The weight of the final product is 2.9 g and it contains 70% of wirtzite-like boron nitride. The wurtzite-like boron nitride purified as described in Example 1 has a pycnometric density of 3.20 g/cm$^3$, a refractive index in red light of less than 2.10, a temperature of the commencement of transition into graphite-like boron nitride of 700° C, and a specific surface area of 40 m$^2$/g.

EXAMPLE 14

A mixture of 2 g of graphite-like boron nitride powder and 3 g of a 2% solution of NaOH are treated as described in Example 1.

After the detonation of the explosive charge, the contents of the ampoule are treated as described in Example 11.

The yield of the final product is 1.5 g; the content of wurtzite-like boron nitride therein is 99.5%. The use of the NaOH solution makes it possible to obtain practically pure wurtzite-like boron nitride characterized by a density of 3.25 g/cm$^3$, a refractive index in red light of less than 2.10, a temperature at the commencement of transition into graphite-like boron nitride of 700° C, and a specific surface area of 25 m$^2$/g.

EXAMPLE 15

Figure 3:
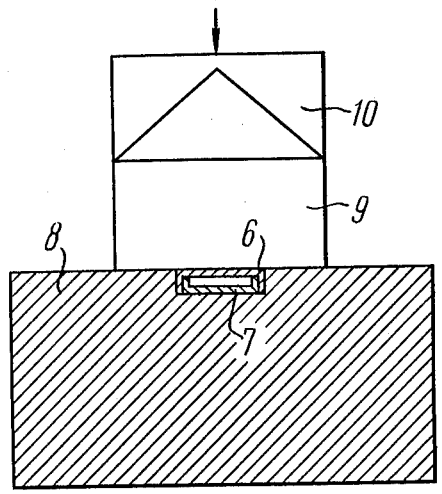
FIG. 3 is a sectional view of another embodiment of an arrangement for obtaining a shock wave by explosion.

A mixture consisting of 4.25 g of graphite-like boron nitride and 4.25 g of lead chloride is thoroughly mixed in a ball mill. The resulting mixture is placed into a protective device as shown in FIG. 3.

The protective device is constituted by two steel cylindrical containers 6 and 7 arranged one inside the other and is placed into a steel die 8 which is 200 mm in diameter and 100 mm in height. The external container 6 which is 12 mm high and whose outside diameter is 45 mm has an inner space 35 mm in diameter and 8 mm in height. The internal container 7 which is 8 mm high and whose outside diameter is 35 mm has an inner working space 30 mm in diameter and 4 mm in height. An explosive charge 9 is placed onto the ampoule which consists of a mixture of trotyl with talc in a ratio of 60:40, having a density of 1.4 g/cm$^3$. The diameter of the charge is 100 mm and its height is 50 mm. The explosive charge consisting of the mixture of trotyl and talc is placed onto generator 10 for a plane detonation wave. Upon detonation of the charge, a pressure of 110 kbar is created in the mixture of the graphite-like boron nitride and lead chloride. After the detonation of the explosive charge, the ampoule is opened, the mixture is removed therefrom and treated as described in Example 1. The yield of wurtzite-like boron nitride is 16 wt.%.

If instead of a charge of an explosive substance consisting of a mixture of trotyl and talc are taken in a ratio of 60:40 and with a density of 1.4 g/cm$^3$ a less powerful charge may be used, consisting of a mixture of trotyl with talc in a ratio of 50:50, which has the same initial density and geometrical dimensions as the mixture of the graphite-like boron nitride with lead chloride wherein the pressure of only 100 kbar is attained and the yield of wurtzite-like boron nitride is about 3%.

If under the same experimental conditions a pressure of 100 kbar is employed for treating not the mixture of graphite-like boron nitride with lead chloride but the pure graphite-like boron nitride having an initial density of 1.5 to 2.0 g/cm$^3$, the yield of wurtzite-like boron nitride is also negligibly small.

If under the same experimental conditions of subjecting a mixture to a pressure of 110 kbar said mixture consisting of 50 wt.% of graphite-like boron nitride and 50 wt.% of cubic boron nitride, and which has the same shock impedance as wurtzite-like boron nitride, then the recovered specimen contains a negligibly small quantity of wurtzite-like boron nitride; in other words, the addition of cubic boron nitride in this case does not contribute to the irreversible conversion of the graphite-like boron nitride into wurtzite-like boron nitride.

EXAMPLE 16

Figure 4:
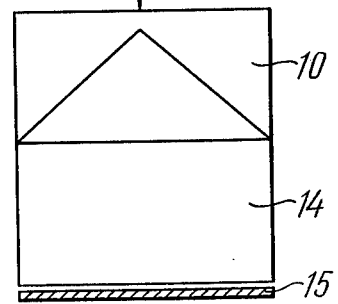
FIG. 4 is a sectional view of an arrangement for obtaining a shock wave by an impact of a metal plate.
Figure 4:
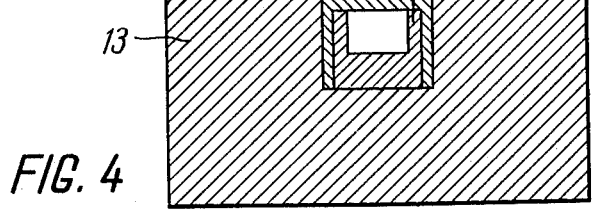

A mixture consisting of 12 g of graphite-like boron nitride and 5.45 g of water having a shock impedance of 0.5.10$^6$ g/cm$^2$·sec is placed into a protective device as shown in FIG. 4.

The protective device consists of two copper cylindrical containers 11 and 12 arranged one inside the other and is placed into a steel die 13 that has a diameter of 200 mm and a height of 100 mm. The external container 11 with a height of 45 mm and an outside nitride. The pycnometric density of the wurtzite-like boron nitride. The pycnometric density of the wurtzite-like boron nitride is 3.38 g/cm$^3$; the refractive index is less than 2.10 for red lights; the temperature upon commencement of transition into graphite-like boron nitride is about 700° C; and the specific surface area is 30 m$^2$/g.

EXAMPLE 4

A mixture of 2.24 g of graphite-like boron nitride and 13.76 g of lead fluoride having a dynamic rigidity of about 3.10$^6$ g/cm$^2$. sec are treated as described in Example 1. The mixture extracted from the ampoule after the explosion is treated with dilute (1:1) nitric acid to remove the lead fluoride and inclusions of the ampoule material and the procedure follows according to that described in Example 1. The yield of pure wurtzite-like boron nitride is about 76% of the weight of the starting graphite-like boron nitride. The wurtzite-like boron nitride thus produced has a density of 3.31 g/cm$^3$; a refractive index of less than 2.10 for red light; the temperature upon commencement of transition into graphite-like boron nitride is about 700° C; and specific surface area is 35 m$^2$/g.

EXAMPLE 5

A mixture of 2.8 g of graphite-like boron nitride powder and 17.2 g of lead bromide having a dynamic rigidity of about 2.5.10$^6$ g/cm$^2$· sec and treated as described in Example 1. After the detonation of the explosive charge, the contents of the protective device are treated with dilute (1:1) nitric acid so as to remove the lead bromide and the inclusions of the ampoule material, then with water, and further treated as described in Example 1. The yield of wurtzite-like boron nitride is 80% of the weight of the graphite-like boron nitride. This wurtzite-like boron nitride has a pycnometric density of 3.30 g/cm$^3$; the refractive index is less than 2.10 for red light; the temperature of the commencement of transition into graphite-like boron nitride is about 700° C; and specific surface area, 37 m$^2$/g.

EXAMPLE 6

A mixture of 5.4 g of graphite-like boron nitride powder and 5.4 g of potassium bromide powder having a dynamic rigidity of about 0.98.10$^6$ g/cm$^2$ sec are treated as described in Example 1.

After the detonation of the explosive charge, the contents of the protective device are treated first with dilute hydrochloric acid, then with hot water so as to remove the inclusions of the ampoule material and potassium bromide, and is further treated as in Example 1. The yield of wurtzite-like boron nitride in this case was 50% by the weight of that of the graphite-like boron nitride. The wurtzite-like boron nitride has a pycnometric density of 3.22 g/cm$^3$, a refractive index of less than 2.10 for red light, a temperature of the commencement of transition into graphite-like boron nitride of 700° C and a specific surface area of 25 m$^2$/g.

EXAMPLE 7

A mixture of 2.5 g of graphite-like boron nitride powder and 2.5 g of lithium fluoride powder having a dynamic rigidity on the order of 1.6.10$^6$ g/cm$^2$· sec are treated as described in Example 1.

After the detonation of the explosive charge, the contents of the ampoule are treated with dilute (1:1) nitric acid so as to remove the additive and inclusions of the protective device material; the procedure followed according to Example 1. The yield of wurtzite-like boron nitride is 60% of the weight of the graphite-like boron nitride. The wurtzite-like boron nitride has a density of 3.22 g/cm$^3$, a refractive index in red light of less than 2.10, a temperature of the commencement of transition into graphite-like boron nitride of about 700° C and a specific surface area of 25 m$^2$/g.

EXAMPLE 8

A mixture of 4 g of graphite-like boron nitride powder and 4 g of copper powder having a dynamic rigidity on the order of 3.9.10$^6$ g/cm$^2$sec are treated as described in Example 1.

After the detonation of the explosive charge, the contents of the ampoule are treated as described in Example 7. The yield of wurtzite-like boron nitride is 50% of that of the weight of the graphite-like boron nitride. The density of the wurtzite-like boron nitride is 3.31 g/cm$^3$; the refractive index in red light is less than 2.10; the temperature of the commencement of transition into graphite-like boron nitride is 700° C; and the specific surface area is 25 m$^2$/g.

EXAMPLE 9

A mixture of 4 g of graphite-like boron nitride powder and 4 g of iron powder having a dynamic rigidity of 3.9.10$^6$ g/cm$^2$ sec are treated as described in Example 1.

After the detonation of the explosive charge, the contents of the ampoule are treated as described in Example 7. The yield of wurtzite-like boron nitride is 60% of the weight of the graphite-like like boron nitride. The density of the wurtzite-like boron nitride is 33.3 g/cm$^3$; refractive index in red light is less than 2.10; the temperature of the commencement of transition into graphite-like boron nitride is 700° C; and the specific surface area is 25 m$^2$/g.

EXAMPLE 10

A mixture of 3 g of graphite-like boron nitride powder and 4 g of aluminum powder having a dynamic rigidity of the order of 1.7.10$^6$ g/cm$^2$ sec are treated as described in Example 1. After the detonation of the explosive charge, the contents of the protective device are treated with dilute (1:1) hydrochloric acid so as to remove the aluminum and inclusions of the ampoule material, and the procedure continues according to that of Example 1. The yield of wurtzite-like boron nitride is 65% of the weight of the graphite-like boron nitride. The pycnometric density of the wurtzite-like boron nitride is 3.32 g/cm$^3$. The refractive index is less than 2.10 in red light; the temperature at the commencement of transition into graphite-like boron nitride is 700° C; and the specific surface area is 25 m$^2$/g.

EXAMPLE 11

A mixture containing 2.5 g of graphite-like boron nitride powder and 2.5 g of water, said mixture having a dynamic rigidity of 0.50.10$^6$ g/cm$^2$· sec is thoroughly mixed in a ball mill and placed in the protective device described in Example 1. Shock waves are generated by detonating a charge of cast trinitrotoluene. The contents of the ampoule are extracted and treated with dilute (1:1) nitric acid to remove the inclusions of the ampoule material. The contents are then washed with water and dried at a temperature of 200° to 300° C. The diameter of 50 mm and has an inner space whose diameter is 45 mm and a height of 35 mm. The internal container 12 with a height of 35 mm and an outside diameter of 35 mm has a working space with a diameter of 30 mm and a height of 20 mm. A device is arranged 25 mm above the protective device which comprises a generator 10 having a plane shock wave and an explosive charge 14 of trotyl having a density of 1.5 g/cm$^3$, with a diameter of 120 mm and a height of 80 mm, and an aluminum plate 14 which is 4 mm thick and positioned 1 mm away from the explosive charge 14. When the explosive charge 14 is detonated, the products of detonation accelerate the aluminium plate 15 to a certain speed. The collision of the accelerated aluminium plate with the protective device results in the creation of a pressure of 600 kbar, and the pressure on the boundary between the copper and the mixture being treated is about 220 kbar. While passing through said mixture, the shock wave gradually fades.

After the detonation of the explosive charge, the protective device is opened, and the mixture is treated with dilute (1:1) nitric acid to remove inclusions of the ampoule material, and the procedure is further conducted as described in Example 1.

The yield of wurtzite-like boron nitride is 8.4 g (70%).

We have carried out an experiment for producing wurtzite-like boron nitride from graphite-like boron nitride under the same conditions and with the same quantity of boron nitride as above, but in the absence of additives. The yield of wurtzite-like boron nitride in the latter case was 1.8 g (15%).

It is thus obvious, that the present invention, with the use of the same source for generating shock-waves, produces an essential increase in the quantity of wurtzite-like boron nitride produced in one cycle by increasing the degree of conversion of graphite-like boron nitride into wurtzite-like boron nitride and by increasing the quantity of graphite-like boron nitride that can be treated by a shock wave in one cycle.

What we claim is:

1. A method of producing highly imperfect wurtzitic boron nitride with enhanced activity, comprising preparing a mixture consisting essentially of a powder of graphitic boron nitride and a sufficient amount of an additive selected from the group consisting of water and aqueous alkaline solutions to fill the pores between the particles of said graphitic boron nitride, and subjecting said mixture to the action of a shock wave with a pressure of not less than 100 kbar.

2. A method as claimed in claim 1, wherein said graphitic boron nitride and said additive are mixed in a ratio of from 1:0.5 to 1:0.2.

3. The method of claim 1, wherein water is used as the additive.

4. The method of claim 1, wherein aqueous alkaline solutions are used as the additive.

5. A method as claimed in claim 4, wherein said aqueous alkaline solution is an aqueous solution of a member of the group consisting of sodium hydroxide, potassium hydroxide, and sodium carbonate.

* * * * *